(12) United States Patent
Peloski

(10) Patent No.: US 9,860,124 B2
(45) Date of Patent: Jan. 2, 2018

(54) CONFIGURABLE CLOUD-BASED ROUTING

(71) Applicant: Aria Solutions, Inc., Calgary (CA)

(72) Inventor: Paul Peloski, Calgary (CA)

(73) Assignee: ARIA SOLUTIONS, INC., Calgary (CA)

( * ) Notice: Subject to any disclaimer, the term of this patent is extended or adjusted under 35 U.S.C. 154(b) by 0 days.

(21) Appl. No.: 14/629,493

(22) Filed: Feb. 24, 2015

(65) Prior Publication Data

US 2015/0288564 A1  Oct. 8, 2015

Related U.S. Application Data

(63) Continuation-in-part of application No. 14/242,883, filed on Apr. 2, 2014, now Pat. No. 9,015,250.

(51) Int. Cl.
| | | |
|---|---|---|
| *H04L 12/24* | (2006.01) | |
| *H04L 29/08* | (2006.01) | |
| *G06Q 10/06* | (2012.01) | |

(52) U.S. Cl.
CPC ...... *H04L 41/0816* (2013.01); *H04L 41/0253* (2013.01); *H04L 67/10* (2013.01); *H04L 67/1002* (2013.01); *G06Q 10/063112* (2013.01)

(58) Field of Classification Search
CPC ........ G06Q 10/063112; H04L 41/0253; H04L 41/0816; H04L 67/10; H04L 67/1002
See application file for complete search history.

(56) References Cited

U.S. PATENT DOCUMENTS

| | | | | |
|---|---|---|---|---|
| 6,449,646 B1 * | 9/2002 | Sikora | ................. | H04Q 3/0045 709/224 |
| 6,868,152 B2 * | 3/2005 | Statham | .................. | H04M 3/22 379/112.06 |
| 7,103,562 B2 * | 9/2006 | Kosiba | ................... | G06Q 10/04 379/265.06 |
| 7,366,293 B2 * | 4/2008 | Ezerzer | ............... | H04L 41/0893 379/265.09 |
| 7,730,135 B2 * | 6/2010 | Petrovykh | ............ | G06Q 10/107 370/352 |
| 7,787,609 B1 * | 8/2010 | Flockhart | ............ | H04M 3/5233 379/265.01 |
| 7,792,773 B2 * | 9/2010 | McCord | .............. | H04M 3/5233 706/47 |
| 8,380,555 B2 * | 2/2013 | Kohler | ........... | G06Q 10/063116 705/7.25 |
| 8,386,639 B1 * | 2/2013 | Galvin | .................. | G06Q 10/06 370/270 |
| 8,391,465 B1 * | 3/2013 | Porter | ................. | H04M 3/5175 379/265.05 |
| 8,543,686 B2 * | 9/2013 | Huh | ....................... | G06F 9/505 709/223 |
| 8,594,306 B2 * | 11/2013 | Laredo | .................... | H04M 3/00 379/265.11 |
| 8,605,886 B2 * | 12/2013 | Johri | ..................... | G06Q 10/06 379/265.01 |

(Continued)

*Primary Examiner* — Patrice Winder
(74) *Attorney, Agent, or Firm* — Galvin Patent Law LLC; Brian R. Galvin

(57) ABSTRACT

A system for adaptive cloud-based work routing comprising a work router for assigning work tasks and a routing configuration server for configuring operation or monitoring performance of a work router, and a graphical user interface for configuration of a cloud-based work router.

2 Claims, 6 Drawing Sheets

(56) References Cited

U.S. PATENT DOCUMENTS

| | | | | |
|---|---|---|---|---|
| 8,718,267 B2* | 5/2014 | Flockhart | H04M 3/5232 | 379/265.06 |
| 9,031,223 B2* | 5/2015 | Smith | H04M 3/5231 | 379/265.01 |
| 9,083,804 B2* | 7/2015 | Conway | H04M 3/5233 | |
| 9,098,509 B1* | 8/2015 | Kapoor | G06F 17/30023 | |
| 9,386,152 B2* | 7/2016 | Riahi | G06N 99/005 | |
| 9,729,709 B1* | 8/2017 | Edwards | H04M 3/42357 | |
| 2004/0083479 A1* | 4/2004 | Bondarenko | G06F 9/546 | 719/310 |
| 2008/0219429 A1* | 9/2008 | Mandalia | H04M 3/5175 | 379/266.02 |
| 2009/0190743 A1* | 7/2009 | Spottiswoode | H04M 3/5232 | 379/265.11 |
| 2009/0190744 A1* | 7/2009 | Xie | H04M 3/5232 | 379/265.11 |
| 2009/0190746 A1* | 7/2009 | Chishti | H04M 3/5232 | 379/265.12 |
| 2011/0096762 A1* | 4/2011 | Basart | H04L 43/0852 | 370/338 |
| 2011/0255675 A1* | 10/2011 | Jasper | H04M 3/5237 | 379/112.1 |
| 2012/0296866 A1* | 11/2012 | Doddavula | G06F 17/30575 | 707/609 |
| 2013/0095807 A1* | 4/2013 | Bhaumik | H04W 4/023 | 455/417 |
| 2013/0191185 A1* | 7/2013 | Galvin | G06Q 30/01 | 705/7.37 |
| 2013/0236002 A1* | 9/2013 | Jennings | H04M 3/00 | 379/265.12 |
| 2013/0251129 A1* | 9/2013 | Jasper | H04M 3/5237 | 379/112.05 |
| 2013/0321070 A1* | 12/2013 | Gagne | G05F 1/12 | 327/538 |
| 2014/0140494 A1* | 5/2014 | Zhakov | H04M 3/5175 | 379/265.03 |
| 2014/0177821 A1* | 6/2014 | Ristock | G06Q 10/0631 | 379/266.08 |
| 2015/0030152 A1* | 1/2015 | Waxman | H04M 3/5233 | 379/265.11 |
| 2015/0117632 A1* | 4/2015 | Konig | H04M 3/5233 | 379/265.12 |

* cited by examiner

CONFIGURABLE CLOUD-BASED ROUTING

CROSS-REFERENCE TO RELATED APPLICATIONS

This application is a continuation-in-part of U.S. patent application Ser. No. 14/242,883 titled "ADAPTIVE CLOUD-BASED WORK ROUTING", filed on Apr. 2, 2014, the entire specification of which is incorporated hereby by reference.

BACKGROUND OF THE INVENTION

Field of the Art

The disclosure relates to the field of task management, and more particularly to the field of routing and assigning work tasks.

Discussion of the State of the Art

It is common for enterprises and corporations in the art to employ internal work routing systems, to assign work tasks to resources such as software systems or human personnel. Generally, these routing systems require the manual configuration of complex routing strategies, to instruct the system regarding how to assign work properly. Rules are configured and followed, and any change to routing must be effected by updating and rewriting these routing strategies.

Such arrangements can be very costly, in terms of resources (hardware and software resources must be dedicated to performing routing operations), time and money (employing someone to maintain the routing strategies). Additionally, such arrangements do not allow for adaptive behavior, and must be manually updated if any changes are desired. Again, this can be quite costly as changes to routing must now be performed manually, based on any observed results or metrics from prior routing decisions, which therefore requires personnel to review or monitor operations to determine if changes are needed.

What is needed, is a means to enable a human user to configure operation of an adaptive work routing solution, requiring minimal technical knowledge or familiarity with a specific cloud-based routing platform.

SUMMARY OF THE INVENTION

Accordingly, the inventor has conceived and reduced to practice, in a preferred embodiment of the invention, a system for adaptive cloud-based work routing and means for a human user to configure operation of the system with minimal technical knowledge.

According to a preferred embodiment of the invention, a system for adaptive cloud-based work routing comprising a work router for assigning work tasks and a routing configuration server for configuring operation or monitoring performance of a work router, is disclosed. According to the embodiment, the work router and configuration system may be software components operating on a network-connected device (for example, a server or other network-connected computing device), and it should be appreciated that they may (as appropriate, according to a particular arrangement) operate independently (that is, on separate physical devices, such as in a distributed arrangement where interaction may occur over a network connection) or jointly on a single device.

According to the embodiment, a work router may receive work tasks from a plurality of clients (such as contact centers, individual devices, or any other potential source of work information), such as via communication over a network such as the Internet or other appropriate communications network. Work tasks may be any assignment that may be desired, such as (for example) a particular inbound call from a customer (as may be received from a contact center) or a scheduled meeting between two parties (as might be received from a business or enterprise client). Such work tasks may then be compared by the work router to any known or retrieved criteria, such as (for example) checking known statistics pertaining to a contact center to see what agents are available, what skills or training they have had, how long they may have been waiting for a customer interaction, or any other of a variety of relevant metrics. The work router may then send a work assignment to a resource, based at least in part on the results of comparison performed (such as returning a specific agent to route a customer interaction to).

According to the embodiment, a "resource" may be any potential endpoint for a work assignment, such as a human operator or a software or hardware device or service that may handle a work assignment, and may vary according to the nature of a particular assignment. Exemplary resources may include the client itself (such as an interactive voice response (IVR) system being assigned a work task such as for placing a call in a particular queue) or a resource operated by the client (such as giving an assignment to a particular agent in the contact center that the work task originated from), or a resource not related to the client such as an agent in a different contact center or a third-party assignment service as is described below. It should be appreciated that the destination for a work assignment may not be the same as the source of a work task—for example, in a distributed contact center arrangement (such as a single corporation operating multiple separate contact centers and utilizing a single cloud-based work router), a contact center A may submit a work task, and based on the results of comparison performed the work assignment may be sent to another contact center B (for example if the optimal agent for the interaction is in contact center B, or if a custom called contact center A after the close of business hours). Additionally (and continuing with the exemplary contact center use case), a work assignment may be given to a contact center in general (such as to then be routed according to a contact center's normal operation, for example based on internal call queuing protocols) or to a specific agent (such as when a work router is used to perform call queuing functions and no internal system is needed), as may be appropriate according to a particular arrangement. It should be appreciated that such behavior may be configurable (as described below), and a single work router may perform a variety of functions or operate according to a variety of configurations based on a particular client or work task, such that a single work router may facilitate operation for a variety of clients and resources that may have varying needs or preferences regarding operation (for example, one contact center may wish to perform internal call queuing and only utilize a work router for non-customer interaction work tasks, while another contact center may utilize a work router for all call queuing and interaction assignments). In this manner, work routing may be made more efficient than ordinarily possible using in-house solution, that may be more limited in the scope of their assigning abilities. It should be further appreciated that not all communication between clients and a work router may be work tasks or assignments. For example, a client may submit periodic status reports to a work router for use in routing operations, such as contact center agent availability or other metrics, or a resource that received a work assignment may send an acknowledgement of the assignment being received, or a further acknowledgement when an assignment is completed. In this manner a work router may maintain a current model of client status and operations, to further enhance operation and provide relevant and efficient routing service.

Further according to the embodiment, operation of a work router may be configurable via a configuration server. Such configuration server may vary in nature, such as website or other online interface, or via a specific software component operating on a network-connected computer or device, or via a software application programming interface (API) for interaction with third-party products or services, or via a graphical user interface such as that described herein (referring to FIG. 6). A user may interact with a configuration server (such as by using a network-connected device to interact with a web interface) for such purposes as to view or alter configuration data for a work router, for example to input new criteria to be used for comparison (such as updating contact center agent skill sets or updating a work router when particular agents receive new training that may affect how work is assigned to them), or to observe operational data relevant to a work router (such as performance metrics of the router itself, for example work task and assignment statistics such as number of tasks received from particular clients or number of assignments fulfilled). Any configuration information may be stored for future reference, such as in a database or other storage medium (such as integral or removable storage media operated by or connected to a configuration server). In this manner, configuration information may be persistent, facilitating consistent operation without repeated configuration by a user.

Further according to the embodiment, machine learning may be utilized by a work router to enhance operations. For example, as described above a work router may receive status updates or work assignment acknowledgements from clients. Such updates may include information pertaining to a particular work assignment, such as length of time before completion, results of completion (such as whether or not a customer's issue was resolved, or whether a successful sale was made, or any other outcome according to a particular assignment), or any other relevant information. A work router may then utilize such information in future routing decisions, such as (for example) incorporating the results of work assignments in future comparisons, such as to ensure that work is assigned to the ideal resource for completion. For example, in a contact center use case, an agent may have been assigned work that they were trained for but not particularly skilled at performing, yielding poor results. In future routing, this agent may be given lower priority as compared to others with similar training, such that similar work assignments may be given to those agents more likely to yield positive results. Additionally, machine learning may be implemented in the form of A-B testing, or experimental routing behaviors. For example, a work router may choose to send a work assignment to a resource based not only on the results of comparison as described above, but also with the intent of collecting results and other information to see how a resource performs (for example, routing a call to an agent for which no prior calls of this type have been routed). In this manner, a degree of "trial and error" operation may be performed, to attempt to discern unexpected results that may be used to improve operation and that might otherwise not have been realized. Such testing behavior may be configurable, such as allowing a particular percentage of work assignments to be used for testing rather than strict comparison-based routing, and it should be appreciated that machine learning may also be used to improve operation of the testing itself—for example, a work router may find that the results of a particular test were undesirable, and reduce the percentage of tests involving that resource or that work assignment type, or alternately if a test yields positive results then more tests may be performed. In this manner, not only may operations be manually configured as described above, but they may also be seen to adapt and improve through continuous operation.

According to another preferred embodiment of the invention, a graphical user interface (GUI) for configuration of a cloud-based work router is disclosed. According to the invention, such configuration should be possible for a user with minimal technical training and should not require programming knowledge (as is common with current implementations), to maximize effectiveness of configurable routing regardless of user familiarity. Accordingly, the inventor has conceived a user-friendly means for configuration wherein no program code is used, instead utilizing easily-recognizable text- and graphic-based interface elements that may be descriptive of their internal operation. According to the embodiment, a work routing system may internally identify routing elements such as agent skills ("sales", "technical support", etc.), and present these skills in a user-friendly configuration interface for a user to modify routing rules associated with them. Such configuration may be facilitated by easily-understood text fields and menus, with the necessary programming being handled by the router and the configuration interface serving to "fill in the blanks", and populate variables and values based on user input to modify router operation. For example, each skill might have default rules (or previously-configured rules), and these rules may be presented to a user by parsing them into the various text fields and menus in the configuration interface, so a user may easily view existing routing behaviors in an organized fashion. In this manner, a user of unknown skill may be expected to reliably and effectively configure operation of a work router.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
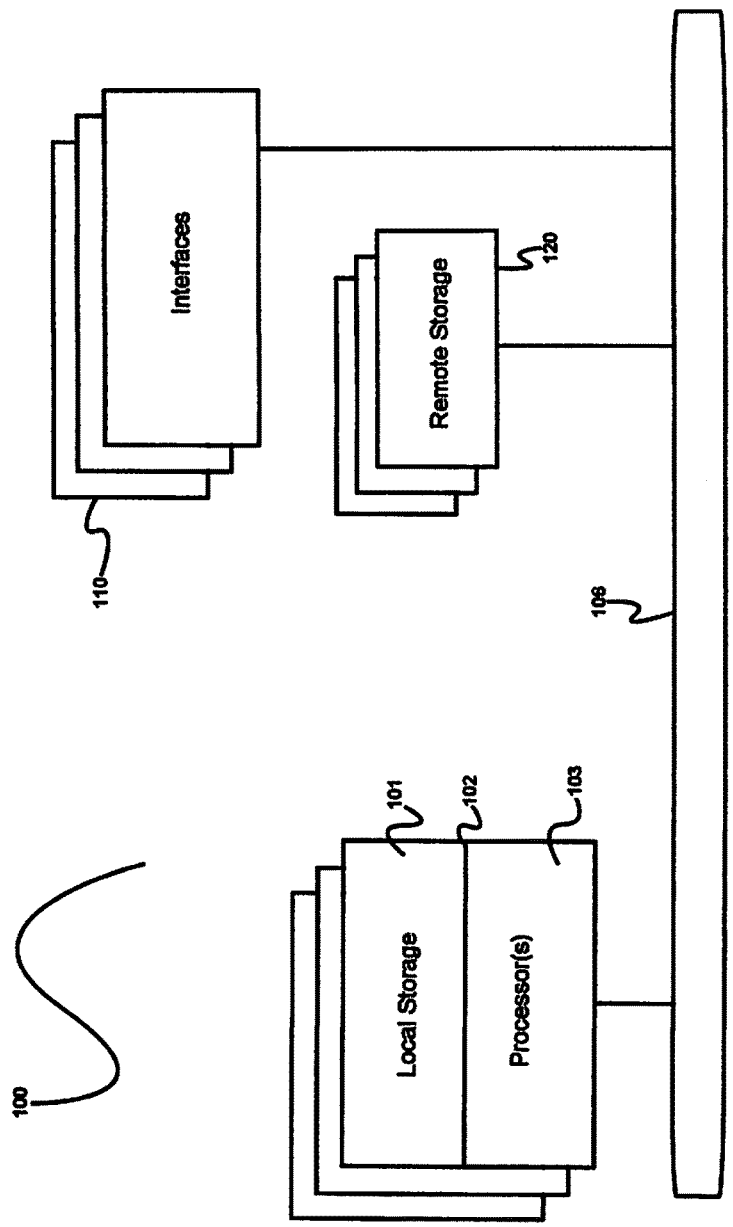
FIG. 1 is a block diagram illustrating an exemplary hardware architecture of a computing device used in an embodiment of the invention.

The inventor has conceived, and reduced to practice, in a preferred embodiment of the invention, a system and method for configurable cloud-based work routing.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
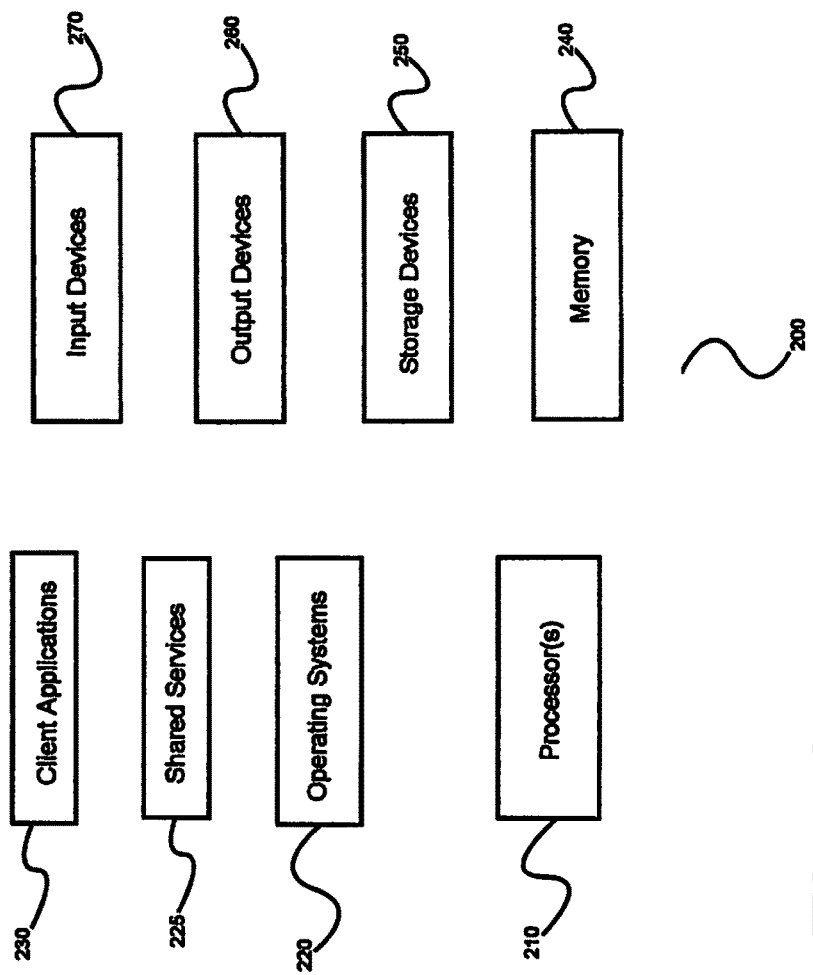
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
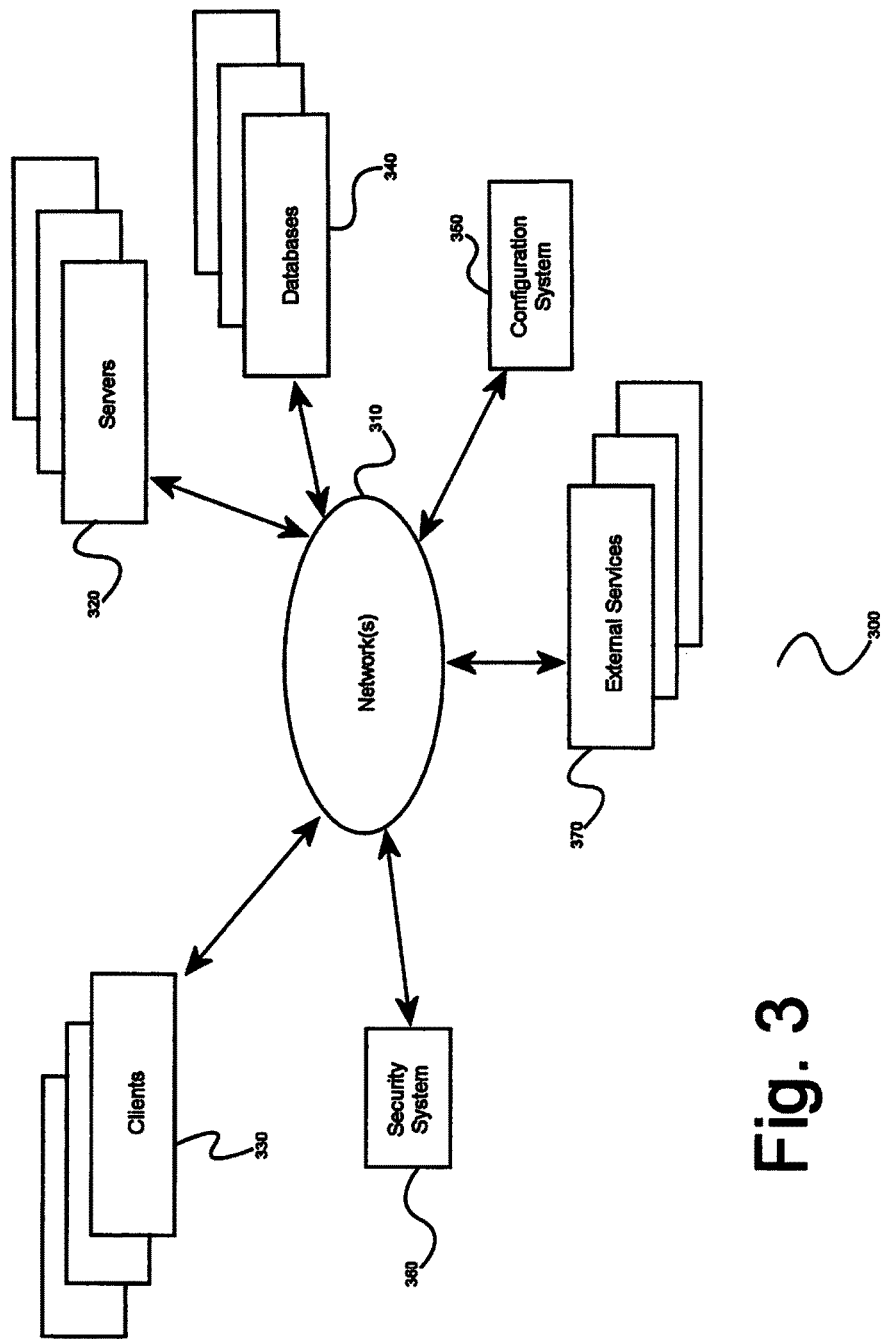
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
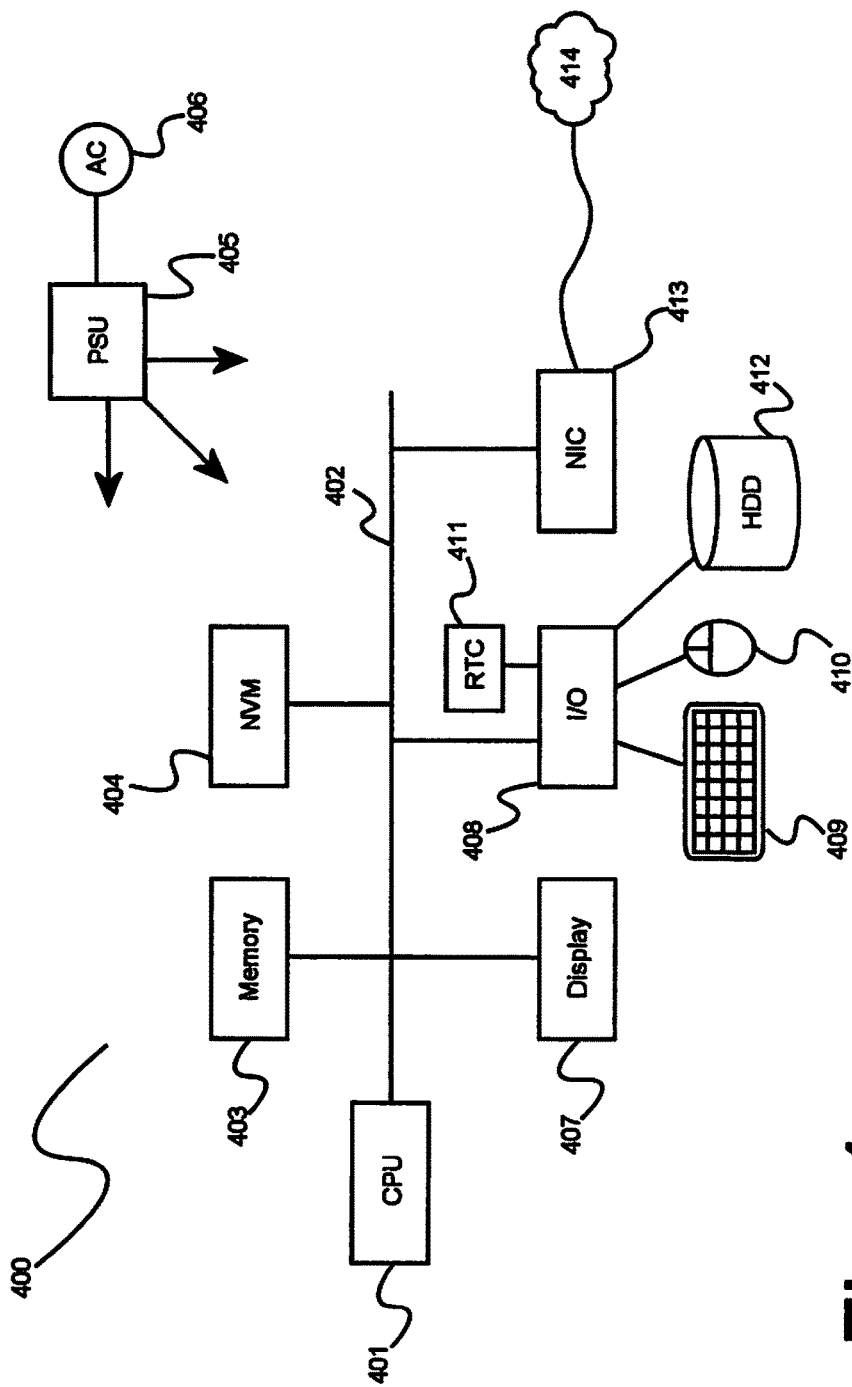
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
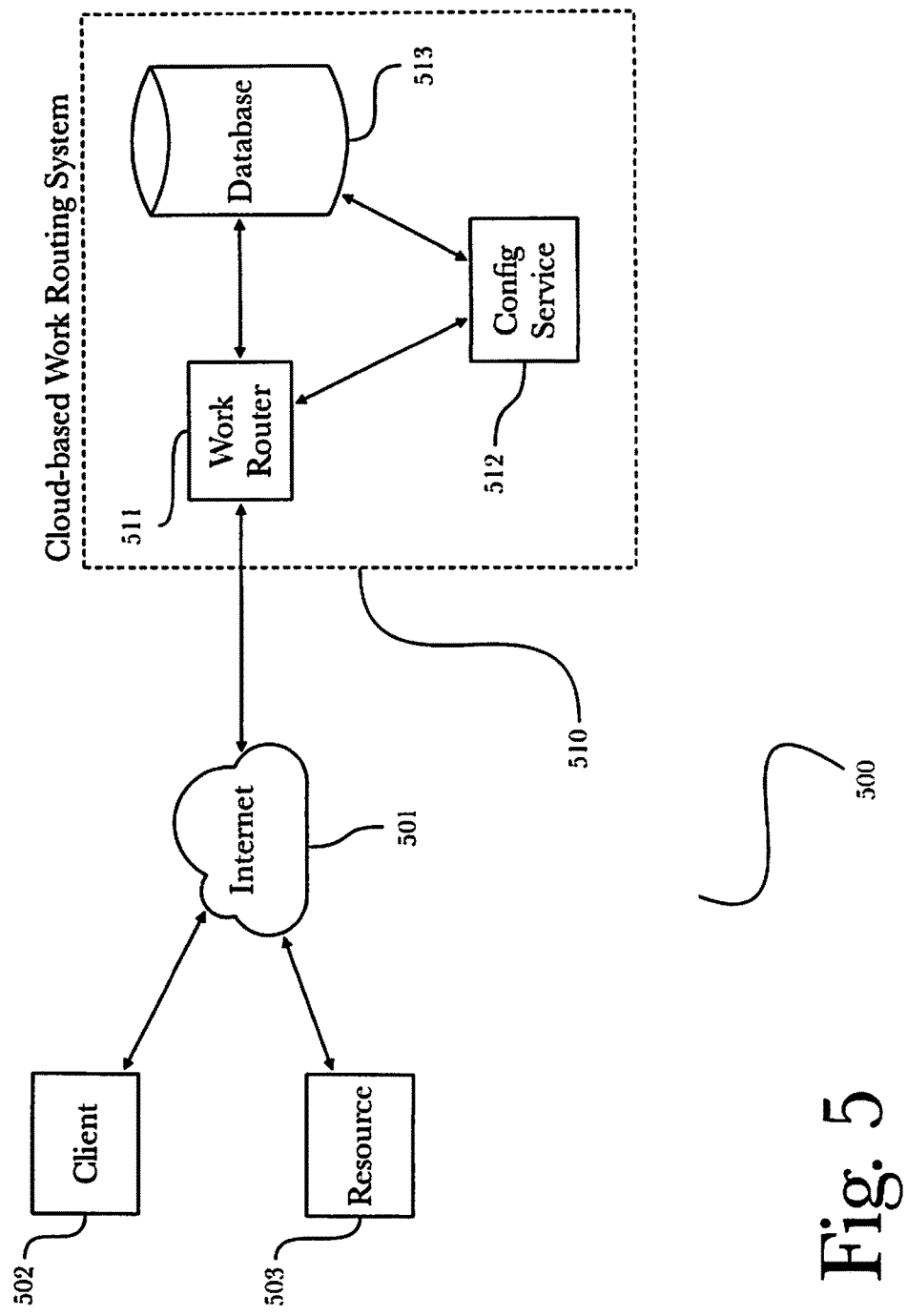
FIG. 5 is a block diagram of an exemplary system architecture for adaptive cloud-based work routing.

FIG. 5 is a block diagram illustrating an exemplary system architecture 500 for providing cloud-based work routing, according to a preferred embodiment of the invention. According to the embodiment, a cloud-based work routing system 510 may comprise a work router 511 for receiving work tasks and routing work assignments, a configuration server 512 for configuring operation of a work router, and a database 513 for storing and providing data (such as, for example, configuration preferences or operation reports) to a work router 511 and configuration server 512. As further illustrated, a cloud-based work routing system 510 may be connected to a communications network such as the Internet 501 or other appropriate network, such as to interact with a plurality of clients 502 and resources 503 for operation. As described previously, both clients 502 and resources 503 may be of varied nature and operation, such as (for example) a contact center or a component system or service of a contact center (such as an IVR, call recording system, or a human resource such as a contact center agent or a review analyst). It should be appreciated that while client 502 and resource 503 are illustrated independently for clarity, such an arrangement is exemplary and a single component may operate as both a client and a resource according to the embodiment (for example, a contact center agent might submit a work task for routing, and then be assigned the resulting work assignment based on routing logic described below).

According to the embodiment, clients 502 may communicate with a cloud-based work router 511 for such purposes as to send work tasks or status reports. A work task may be any action or operation that may be desirable to assign to a resource, regardless of the nature or scope of that task. For example, when a customer calls a contact center, answering the call and interacting with the customer might be a work task (that would, for example, be routed to a contact center agent able to appropriately handle the call). If the customer needs to be contacted at a later time, for example if they request a follow up call, the requested outbound call might be another work task (that would, for example, be assigned to an appropriate agent and optionally scheduled for a requested time or date). Performing any actions requested as a part of the customer interaction, such as account changes or fulfilling a sale, might be a further work task that would then be routed to an appropriate resource such as an account service specialist or a sales representative. In this manner it can be appreciated that work tasks may vary widely and a key function of a work router may be to determine the nature and needs of a particular work task and assign it accordingly. Similarly, status reports may vary in nature and content, such as periodic reports of contact center agent availability, reports on system status (such as notification if there is an issue with, for example, an IVR or a recording system), updates on agent skills or training, or any other such information that may be relevant to work routing operations. These updates may be utilized by a work router 511 in making decisions such as how to assign work tasks, for example when selecting a contact center agent to assign a customer interaction, a work router 511 might check any known agent skills and training to see who is qualified to handle the interaction, as well as availability status to see who is available to receive a work assignment or who has been waiting the longest for one. In this manner, it can be appreciated that a work router 511 may perform functions common to contact centers or other use cases, alleviating the need to maintain an internal system for such purposes.

Further according to the embodiment, a configuration server 512 may be utilized to configure or monitor operations or behavior of a cloud-based work routing system 510. For example, a user (such as a designed administrator for a contact center) may connect to a configuration server (such as via a web interface or other interaction front end) and establish preferences or parameters for operation. These configuration parameters may then be stored in a database 513 and utilized in operations. For example, a system utilized by a contact center may be configured to place priority on call handle time rather than number of sales, such that in subsequent routing decisions calls may be routed preferentially to agents with more desirable call handle time metrics and fewer sales, rather than those that may excel at sales but have less desirable handle time. In this manner, operations may be tailored to a particular client's tastes easily, without having to manually configure or maintain detailed routing strategies as are commonly utilized in the art with internal routing solutions.

Detailed Description of Exemplary Embodiments

Figure 6:
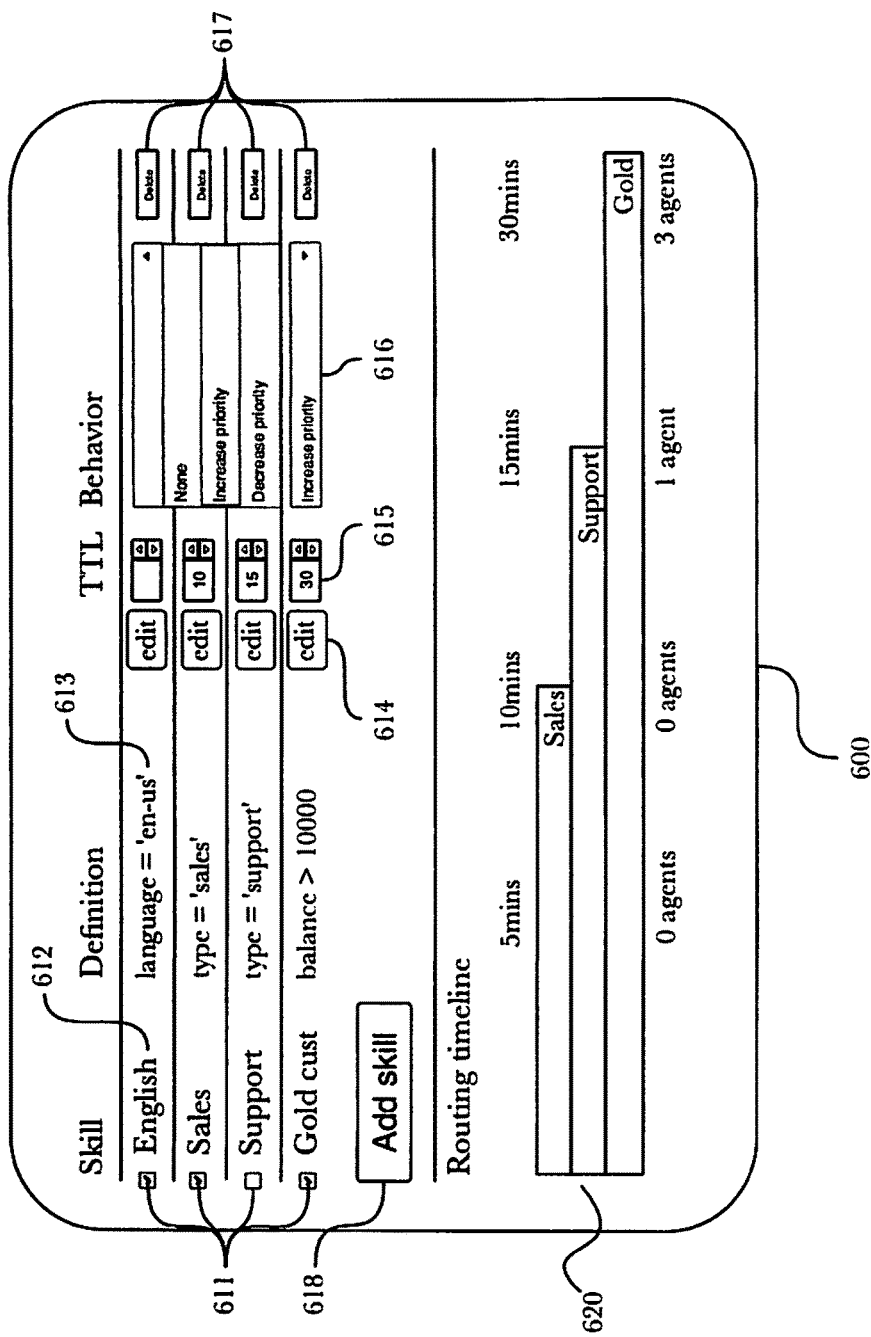
FIG. 6 is an illustration of an exemplary graphical user interface for configuring work router operation, according to a preferred embodiment of the invention.

FIG. 6 is an illustration of an exemplary graphical user interface (GUI) 600 for configuration of a work router, according to a preferred embodiment of the invention. As illustrated, a plurality of check boxes 611 or other interactive means may be presented to a user to easily select what skills 612 are being applied to an interaction (as illustrated, the interaction being routed has the "English", "sales", and "gold customer" skills flagged). This allows a user to easily configure what relevant agent skills apply to a given interaction, to ensure that agents with appropriate training are receiving work tasks. As further illustrated, each skill may have a definition 613 specified, that may represent an internal definition for identifying whether a particular skill is relevant, such as (for example) if an interaction involves a customer whose account balance is over a specified threshold (as illustrated, the threshold has been set at 10,000) applying the "gold customer" skill to identify the interaction as involving a high-value customer. Additionally, a user may be given an interactive element such as a button 614 to edit these skill definitions as needed. Numerical fields 615 may be utilized, such as to specify numerical values such as a skill's time-to-live (TTL) threshold, after which the skill may be removed from an interaction to broaden the scope of routing (for example, by removing skills that may narrow down the number of available agents that are appropriately trained for an interaction). Drop-down menus 616 may also be utilized, such as to allow a user to select from a predetermined list of options such as for special behavior flags, such as altering an interaction's priority (as illustrated). In this manner, a user may choose to configure routing such that certain interactions may be given preference over others when making a routing decision, such that if only a single agent is available a higher-priority interaction may be given to them first. Interactive buttons may be provided for instantaneous actions such as deleting 616 or adding 617 skills to an interaction, such as to alter the available agents for an interaction (by removing skills, the number of agents may be increased by removing limiting factors in routing decisions, likewise adding more skills may narrow down the number of agents by limiting who is allowed to handle the interaction based on their skill qualifications).

According to the embodiment, a timeline 620 may be displayed such as to illustrate a projected timeline for routing according to a specific configuration. As illustrated, based on the selections made it can be seen that no agents will be available to handle the interaction for at least ten minutes, and that a single agent will be available when the "support" skill expires in fifteen minutes. In thirty minutes, when the "gold customer" skill expires and only the "English" language skill remains (as it has been configured without a TTL value, therefore it will always exist on an interaction such as to ensure the interaction is always routed to any English-speaking agent as a last resort), three agents are projected to be available. In this manner a user may see real-time projections of the outcome of their configurations, and may thereby optimize their own input to improve routing based on projected behavior.

According to the embodiment, all skills may be configurable as item modifiers. For example, a configuration display as illustrated represents the configuration for a single specific work item, or for multiple selected items being modified simultaneously. When a user adds or modifies skills as illustrated, these skills function as modifiers to the routing behavior for the selected work items. For example, as illustrated the skills of "English", "sales", and "gold customer" are being applied. When routing work items, any skills that have not yet expired (as determined by the time-to-live variable) apply their associated rules and values to the routing behavior for the work item, such as by limiting which agents are allowed to receive the work item, or what priority the work item is given relative to other work items that may also be eligible for routing at the same time.

The skilled person will be aware of a range of possible modifications of the various embodiments described above. Accordingly, the present invention is defined by the claims and their equivalents.

What is claimed is:

1. A system for adaptive cloud-based work routing, comprising:
    a network-connected computing machine comprising a work router,
    a network-connected computing machine comprising a configuration server,
    a network-connected computing machine comprising a database, and
    a plurality of external resources;
    wherein the configuration server provides interactive software for management of system behavior and operation, the interactive software enabling a user to configure and dynamically change a set of routing rules;
    wherein each routing rule of the set of routing rules comprise at least one skill of a plurality of skills;
    wherein the configuration server associates a threshold to each skill of the plurality of skills, the plurality of skills associated to the plurality of external resources;
    wherein the threshold determines a time-to-live after which the associated skill may be removed from an interaction to broaden a scope of resources of an associated routing rule of the set of routing rules;
    wherein the database stores the routing rules for future use,
    wherein the work router receives communication from a client software application via a packet data network, the information pertaining to a work task to be performed, and
    wherein the work router selects a specific external resource to perform the work task using the routing rules and sends data pertaining to the work task to the specific selected external resource; and
    wherein the work router adapts its routing selections based at least on dynamic changes in the routing rules and based on associated thresholds associated to the skills of the routing rules.

2. A method for providing adaptive cloud-based work routing, comprising the steps of:
    (a) configuring routing rules using a network-connected computing machine comprising a processor and a memory and a plurality of programming instructions stored in the memory and operating on the processor and configured to provide interactive software for management of system behavior and operation, the interactive software enabling a user to configure and dynamically change a set of routing rules;
    (a2) associating a threshold to each skill of the plurality of skills, the plurality of skills associated to external resources;
    (b) receiving data from the external resources pertaining to a work task to be performed;
    (c) processing, using a network-connected computing machine comprising a processor and a memory and a plurality of programming instructions stored in the memory and operating on the processor and configured to provide an adaptive work router;
    (d) selecting an external resource to perform the work task according to the routing rules;
    (e) sending data pertaining to the work task to the selected external resources based at least in part on the processing; and
    (f) receiving dynamic changes to the routing rules and adapting routing selections of the work router based at least on the dynamic changes to the routing rules and based on associated thresholds associated to the skills of the routing rules.

* * * * *